(12) United States Patent
Reppel

(10) Patent No.: US 6,911,113 B2
(45) Date of Patent: Jun. 28, 2005

(54) APPARATUS FOR RECAPPING TIRES

(75) Inventor: Emil Willi Reppel, Falkenberg (SE)

(73) Assignee: Recamic S.A., Givisiez (CH)

( * ) Notice: Subject to any disclaimer, the term of this patent is extended or adjusted under 35 U.S.C. 154(b) by 0 days.

(21) Appl. No.: 09/909,272

(22) Filed: Jul. 19, 2001

(65) Prior Publication Data

US 2002/0017356 A1 Feb. 14, 2002

(30) Foreign Application Priority Data

Jul. 21, 2000 (FR) .............................. 00 09804

(51) Int. Cl.⁷ .............................................. B29D 30/54
(52) U.S. Cl. ............................... 156/405.1; 156/394.1; 156/408; 156/909
(58) Field of Search ................................ 156/96, 394.1, 156/909, 405.1, 408–410; 157/13; 451/920, 221, 123

(56) References Cited

U.S. PATENT DOCUMENTS

| | | | |
|---|---|---|---|
| 2,009,524 A | * | 7/1935 | Schmidt ...................... 157/13 |
| 2,707,851 A | | 5/1955 | Strong .............................. 51/3 |
| 2,945,534 A | | 7/1960 | Hawkinson |
| 2,965,162 A | * | 12/1960 | Hawkinson ................... 157/13 |
| 3,528,476 A | | 9/1970 | Hawkinson, Jr. ............. 157/13 |
| 3,675,706 A | * | 7/1972 | Cahill .......................... 157/13 |
| 4,036,677 A | * | 7/1977 | Marangoni ................... 156/909 |
| 4,515,200 A | | 5/1985 | Williams ....................... 157/13 |
| 5,307,854 A | | 5/1994 | Brewer ......................... 157/13 |
| 6,251,204 B1 | | 6/2001 | Andersson et al. |

FOREIGN PATENT DOCUMENTS

| | | |
|---|---|---|
| AU | 1528470 | 11/1971 |
| CA | 1157103 | 11/1994 |

* cited by examiner

Primary Examiner—Geoffrey L. Knable
(74) Attorney, Agent, or Firm—Fitzpatrick, Cella, Harper & Scinto

(57) ABSTRACT

An apparatus for recapping tires which includes a frame made up of two associated support structures, a first support structure including a mandrel for support of the tire, which mandrel rotates on a shaft, the mandrel being mounted for translation on the first support structure, and a second support structure to support tools for recapping of the tire, which tools are mounted for translation on the second support structure in a direction approximately perpendicular to the translation of the mandrel, characterized in that the direction of translation of the mandrel is parallel to the rotational shaft of the said mandrel.

9 Claims, 2 Drawing Sheets

APPARATUS FOR RECAPPING TIRES

BACKGROUND OF THE INVENTION

The present invention relates to an apparatus for recapping tires. More particularly, the invention relates to a variable machine for rasping, a machine for capping a tire, or a machine comprising a rasper combined with units for applying and rolling treads.

It is known that most tires can be recapped, i.e., after normal wear of the tread, it is possible to replace the tread, and even certain reinforcement plies of the tire. These operations are very common for the tires of transport vehicles, such as heavy goods vehicles, and can be carried out in factories, or in workshops of a greater or smaller size, where problems of dimensions become fundamental.

Many machines which are designed to remove the worn remainders of the tread of tires, an operation which is known as tread removal, have been proposed, as well as so-called capping machines, which are designed to apply a new tread to the tires from which the tread has previously been removed.

At present, there is an increasing demand for "flexible" machines, which can recap tires with different dimensions, and in particular tires which are increasingly wide, both in the case of tires of which the tread extends only on the crown, and that of tires of which the tread also covers the shoulders of the tire, a tread of this type being known as of the "flap" type. This dual constraint of size and geometry poses genuine problems, in terms of the dimensions of the machine, feasibility for flap-type treads, and quality of the recapping carried out.

In fact, the recapping machines which are commonly sold commercially have a frame with vertical lateral flanges, surrounding the tire which is generally disposed vertically. In order for a machine of this type to be able to recap large tires, it is necessary to increase considerably the size of the machine, and thus its dimensions.

Furthermore, the presence of these lateral uprights makes it difficult to access the shoulders of the tire. In order to carry out the tread removal, use is often made of a robot which supports a rasp, but in this case also an increase in the size of the tire gives rise to an increase in the length and rigidity of the arm of the robot which supports the rasp, and consequently gives rise to problems of stability and vibrations, which detract considerably from the quality and accuracy of the work carried out by a machine of this type.

Other types of machines have been proposed, such as that described by way of example in publication AU-1 528 470, in which the frame of the machine comprises a mandrel which rotates and is fixed in translation, which supports the tire in front of which there is displaced in axial and radial translation relative to the axis of the mandrel, a rotary rasp which is guided by means of a template. The disadvantage of using a template is known, associated with the need to change the template in order to accompany a change of dimension of the tire to be recapped, and thus with successive operations of removal and fitting. In addition, the problems of length of the arm which supports the rasp, and thus of stability and vibration, are not solved in this case, since accessibility to the shoulders of the tire is limited by the structure of the machine itself.

Publication EP-0 955 154 presents a different solution, in which the machine has a rotary mandrel which can be displaced in translation, according to a vertical axis which is perpendicular to the rotational shaft of the mandrel, and rotary rasping tools which are fitted above the tire, and can also be displaced in horizontal translation, parallel to the rotational shaft of the mandrel, the axis of the rasping tools being perpendicular to that of the mandrel (FIG. 4 of the publication), in order to permit rasping of the shoulders of the tire to be recapped, if necessary.

In fact, the combination of these two movements of translation makes it possible to carry out the tread removal of a tire which has a flap-type tread, which requires production of a complex profile, with a radius of curvature at the crown, other radii of curvature at the shoulders, and finally a trapezium in order to carry out the descent from the shoulders to the sidewalls. However, this machine does not provide solutions for the problems of vibrations and stability. In fact, for a tire of large size, which is also heavier, the vertical movement of the mandrel can give rise to problems of stability, or even risk giving rise to slight flexure of the rotational shaft of the mandrel. In addition, in order to permit satisfactory access to the shoulders which are disposed opposite the post on which the mandrel is fitted in translation, it is necessary to be able to move the tire sufficiently far away from the post, axially relative to the axis of the mandrel, which increases the risks of a phenomenon of this type occurring.

In order for the machine to function for a very wide tire, it is also necessary to have extended the guide rails for the rasping tools, which are suspended above the tire, thus giving rise to greater vibrations during translation and actuation of these rasping tools.

SUMMARY OF THE INVENTION

The object of the invention is to eliminate these disadvantages and to provide a new variable recapping machine.

Hereinafter, "recapping tools" for a tire means rasping tools, tools for application of a new tread to the tire, or any other tool which can be used when recapping a tire, such as a tool for applying rubber for joining purposes, etc.

According to the invention, the machine which is designed for recapping of tires, with a frame comprising at least two associated structures, including a first support structure for a tire to be recapped, comprising a mandrel for support of the tire, which rotates around an rotational shaft, the mandrel being fitted such as to translate on the said structure, and a second structure to support tools for recapping of the tire, which tools are fitted such as to translate on the said second structure, in a direction approximately perpendicular to that of translation of the mandrel, is characterized in that the direction of translation of the mandrel is parallel to the rotational shaft of the said mandrel.

The movement of translation of the mandrel parallel to its rotational shaft makes it possible to avoid exerting lateral forces on the mandrel, and to keep the center of gravity of the tire on a single axis, parallel to the said rotational shaft. This therefore prevents risks of deformation of the mandrel, while assuring great stability during deformation of the latter, this stability being reinforced by the fact that the weight of the tire is always supported by the base of the frame, i.e., by the ground.

In addition, the separation of the machine into different structures, with a base structure which supports the tire to be recapped, makes it possible to envisage modularity of the machine, which is particularly advantageous in order to be able to develop the machine, for example by adding new modules to it.

Advantageously, the mandrel is fitted such as to translate on two guide rails parallel to its rotational shaft, the two rails being disposed symmetrically relative to the plane which contains the rotational shaft of the mandrel, and approximately perpendicular to the plane which contains the surface of the rails. This symmetrical arrangement accentuates the great stability of the machine, by means of the positioning of the axis of the centers of gravity of the tire between these two rails during displacements of the said tire.

Other characteristics and advantages of the invention will become apparent from reading the description of an embodiment of a machine for recapping according to the invention, with reference to the attached drawings.

DESCRIPTION OF PREFERRED EMBODIMENTS

Figure 1:
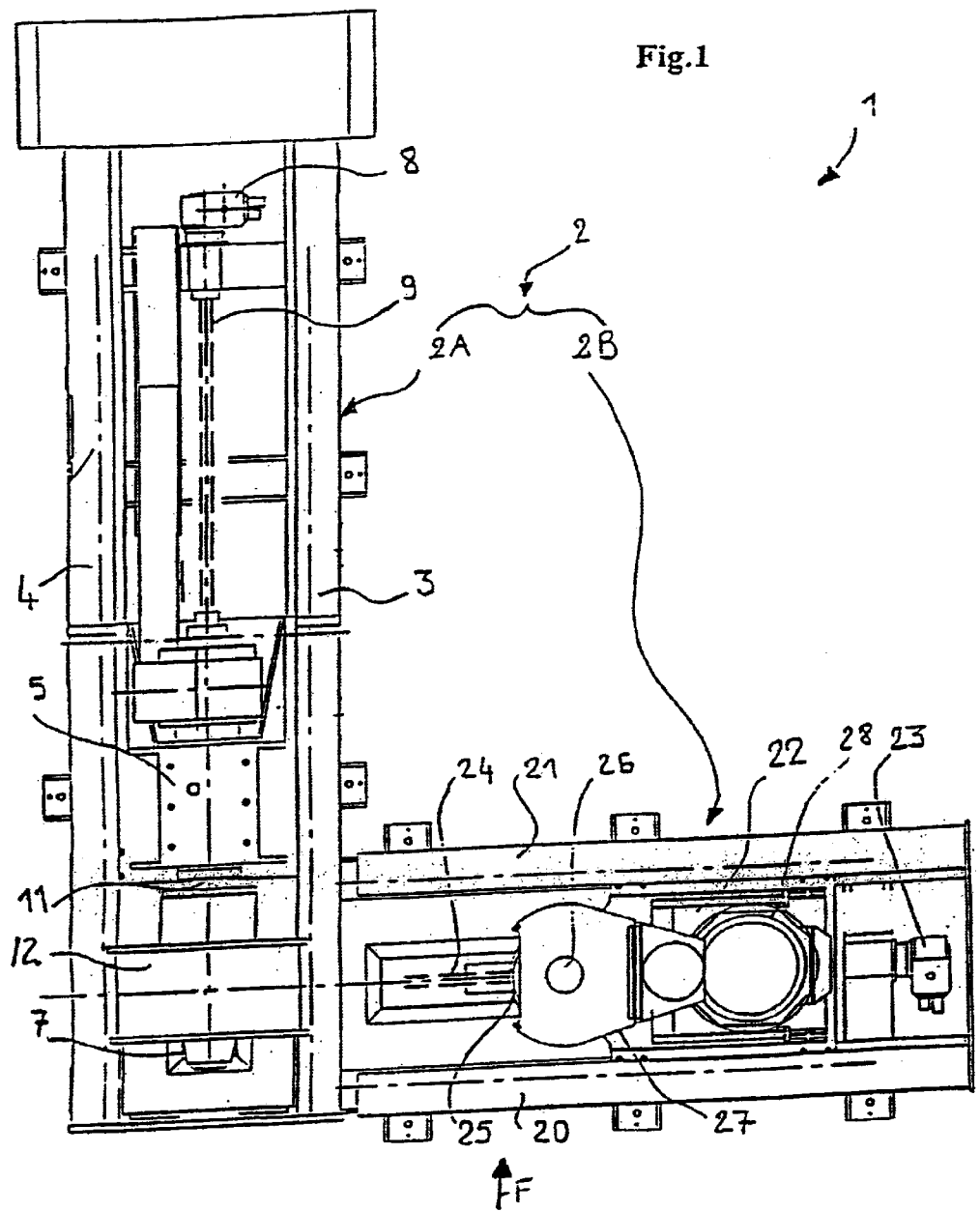
FIG. 1 is a plan view of a machine according to the invention.
Figure 2:
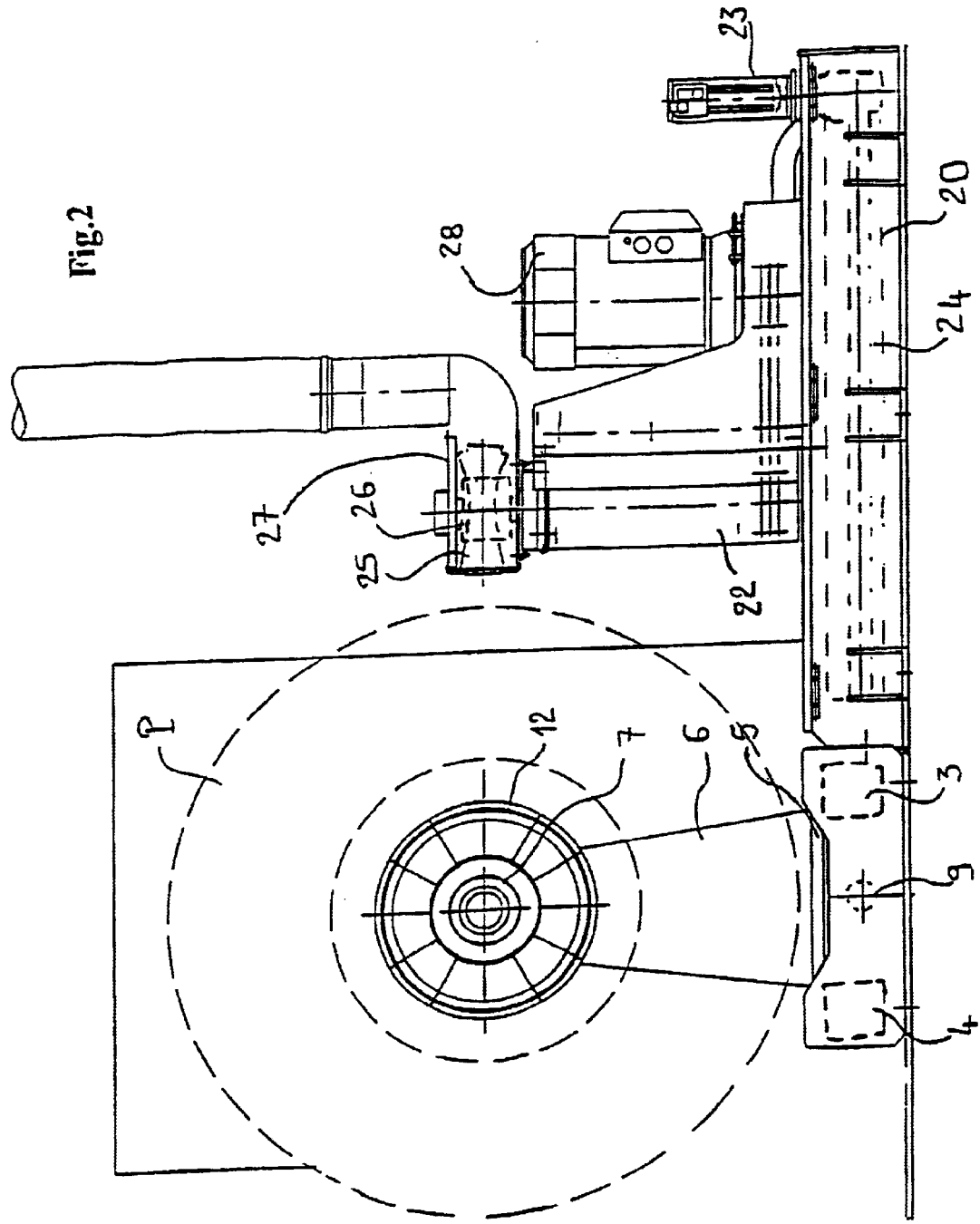
FIG. 2 is a lateral view of the machine represented in FIG. 1, as seen in the direction of the arrow F.

According to FIG. 1, the machine 1 has a horizontal rigid frame 2, comprising two horizontal modular structures 2A and 2B, which are arranged perpendicular to one another, supporting respectively the tire and the rasper, and are integral with one another.

A description will now be provided of a machine which is designed to carry out the tread removal from a tire P, but the invention is not limited to this arrangement alone. The machine can also comprise a module which carries out the recapping with, for example, a third structure disposed opposite the rasper. Other configurations of the machine can also be envisaged, which, for example, make it possible to obtain only the capping structure, or, on the other hand, a rasper and a plurality of capping modules, and/or a rolling module. Since the design of this recapping machine has great stability and accuracy, irrespective of the dimension of the tires to be recapped, in fact it makes it possible to obtain a machine which is altogether variable, on the basis of the basic module which supports the tire to be recapped.

The structure 2A comprises two rails 3 and 4, for guiding of a carriage 5, with a vertical upright 6, on which there is fitted a mandrel 7 for support of a tire, which is fitted on a rotational shaft 11, and comprises an extendable rim 12, the mandrel 7 permitting fitting of tires with very different dimensions, ranging from a passenger car to a heavy goods vehicle (it will be appreciated that it may be advantageous to change the dimension of the rim 12). A motor 8, which is associated with a worm 9, makes it possible to actuate the carriage, in order to give rise to translation of the latter along rails 3 and 4, whereas a second motor actuates the rotational shaft 11 of the mandrel 7, in order to permit rotation of the latter. As will be described in greater detail hereinafter, it is advantageous to use a motor which permits highly accurate positioning, such as a motor with digital control.

The guide rails 3 and 4 are disposed parallel to the rotational shaft 11 of the mandrel 7, and are disposed symmetrically relative to the vertical plane which contains this shaft. The spacing of the rails 3 and 4 is selected taking into account the dimensions of the machine, and the stability of the structure. It is thus possible to envisage having a distance between the two rails which corresponds approximately to the diameter of the rim 12. The length of the rails can be determined according to the number of modules which can be disposed perpendicularly to this structure.

The production of this structure 2A for support of a tire, with movement of translation parallel to the axis of the tire, makes it possible to avoid the risk of deformation or vibration of the mandrel during translation, caused by a heavy weight of a tire, since the center of gravity of the latter is kept on a single axis. In addition, the arrangement of these two symmetrical rails makes it possible to assure great stability of this line of center of gravity. It should also be emphasized that all of the weight is supported directly by the structure, i.e., by the floor itself of the factory or production workshop.

In addition, unlike the machines designed for recapping which are generally commercially available, the tire fitted onto the mandrel is easily accessible, without being put into a frame or stand with vertical uprights, which limit the possibilities of access to the tire by other tools.

The structure 2B also comprises two rails 20, 21, which are perpendicular to the rails 3 and 4, and guide a second carriage 22, which is thus fitted such as to translate perpendicularly to that of the mandrel 7, and is also actuated by a digitally-controlled motor 23, which drives the carriage 22 by means of a worm 24.

On the second carriage 22, there are fitted the rasping tools 25, with a motor 28 and a drive to drive the rasping tool, such that the latter are disposed in the median plane of the tire to be rasped. These rasping tools 25 consist in a conventional manner of a series of circular blades, which are fitted around a rotational shaft 26, this shaft 26 being disposed vertically. It will be appreciated that it is possible to envisage use of rasping tools which are different from those previously described.

In the same way as for the mandrel 7, the rails 20 and 21 are disposed on both sides of the vertical plane which contains the rotational shaft 26, and perpendicularly to the rotational shaft 11 of the mandrel 7. The rasper 25 is covered by a guard 27, which makes it possible to limit dispersal of the dust generated during rasping, suction being provided in order to discharge the dust. In order to assure good stability, and to prevent undesirable vibrations, it is possible to space the two rails 20 and 21 such that the distance which separates them depends on the power of the motor 28 for actuation of the rasping tools. As in the case of the mandrel in the structure 2A, the presence of these two spaced rails provides the rasper with very good stability. In addition, since the carriage 22 is displaced along only a single axis, there is very great stability, accuracy, and a significant decrease in the noise level.

It is evident that the combination of the two movements of horizontal translation of the mandrel and rasper makes it possible for the rasper to come into contact at any point of the surface of the tread, of the shoulders of the tire, and also of the sidewalls of the tire.

It can be understood clearly that recapping of a large-sized tire does not cause any problem from the point of view either of its size or its weight, since a machine which is stable without giving rise to vibrations is obtained, and which is also relatively silent, the only factor to be determined in advance being the length of the rails.

It will be appreciated that the functioning of a machine according to the invention requires means for control of axes and adequate programming, which will not be described here, since they do not constitute the subject of the invention.

I claim:

1. An apparatus for recapping tires comprising a horizontal rigid frame comprising a first horizontal modular structure and a second horizontal modular structure;

(a) wherein said first structure comprises a first set of rails for guiding a first carriage having a vertical upright which supports a rotational shaft on which is fitted a mandrel for support of a tire, wherein said mandrel is mounted for translation on said first structure in a direction parallel to the rotational shaft;

(b) wherein said second structure comprises a second set of rails for guiding a second carriage on which recapping tools are fitted, wherein said recapping tools are mounted for translation on said second structure in a direction approximately perpendicular to the direction of translation of the mandrel; and (c) wherein the first structure and the second structure are arranged perpendicular to one another, and wherein the first set of rails and the second set of rails are disposed in essentially the same horizontal plane.

2. An apparatus according to claim 1, wherein the mandrel is mounted for translation on a first set of two guide rails, wherein said first set of two guide rails is parallel to the shaft of said mandrel, the two rails being disposed symmetrically relative to a plane which contains the shaft of the mandrel, and wherein the plane which contains the shaft of the mandrel is approximately perpendicular to the plane which contains the surface of the first set of two guide rails.

3. An apparatus according to claim 2, wherein the capping tools are mounted on a second set of two guide rails disposed symmetrically relative to a plane which contains the center of the recapping tools, and wherein the plane which contains the center of the recapping tools is approximately perpendicular to the plane which contains the surface of the second set of two guide rails.

4. An apparatus according to claim 1, wherein the movements of translation of the recapping tools and of the mandrel are situated in a single horizontal plane.

5. An apparatus according to claim 1, wherein, in addition to the recapping tools, the second support structure comprises units for rolling a new tread for the tire to be recapped, after the tread has been applied to the latter.

6. An apparatus according to claim 1, wherein the recapping tools comprise rasping tools for the tire to be recapped.

7. An apparatus according to claim 6, wherein the rasping tools comprise a series of circular blades, which are fitted such as to rotate around a rotational shaft, said rotational shaft being disposed approximately perpendicularly to the direction of translation of said tools.

8. An apparatus according to claim 1, wherein the recapping tools include tools for application of a tread.

9. An apparatus according to claim 1, comprising at least one additional structure for supporting tools for recapping the tire, which are mounted to translate the tools on the corresponding structure, in a direction which is approximately perpendicular to the direction of translation of the mandrel.

* * * * *